United States Patent [19]

Sanders

[11] Patent Number: 5,292,576
[45] Date of Patent: Mar. 8, 1994

[54] WALL COVERING

[75] Inventor: Kenneth H. Sanders, Jonesville, S.C.

[73] Assignee: Milliken Research Corporation, Spartanburg, S.C.

[21] Appl. No.: 78,633

[22] Filed: Jun. 21, 1993

[51] Int. Cl.⁵ .......................... B32B 5/08; B32B 5/12; B32B 7/12

[52] U.S. Cl. ................... 428/232; 428/246; 428/248; 428/253; 428/904.4

[58] Field of Search ............... 428/232, 246, 248, 253, 428/904.4

[56] References Cited

U.S. PATENT DOCUMENTS

| | | | |
|---|---|---|---|
| 3,279,221 | 10/1966 | Gliksmann | 66/192 |
| 3,962,510 | 6/1976 | Worcester et al. | |
| 4,277,527 | 7/1981 | Duhl | 428/109 |
| 4,297,156 | 10/1981 | Dalle | |
| 4,330,580 | 5/1982 | Dalle | 428/229 |
| 4,349,593 | 9/1982 | Blechstein | |
| 4,388,364 | 6/1983 | Sanders | |
| 4,608,290 | 8/1986 | Schnegg | 428/109 |
| 4,611,362 | 9/1986 | Sinclair | |
| 4,654,254 | 3/1987 | Gerry et al. | |
| 4,724,179 | 2/1988 | Schnegg | 428/109 |
| 4,828,909 | 5/1989 | Davis et al. | |
| 4,863,777 | 9/1989 | Callaway | |
| 5,133,199 | 7/1992 | Parikh et al. | |

*Primary Examiner*—James C. Cannon
*Attorney, Agent, or Firm*—Terry M. Moyer; Earle R. Marden

[57] ABSTRACT

A wallcovering having a weft inserted warp knit fabric as a substrate with the inserted weft yarn being cotton with a count in the range of 18's-30's.

6 Claims, 1 Drawing Sheet

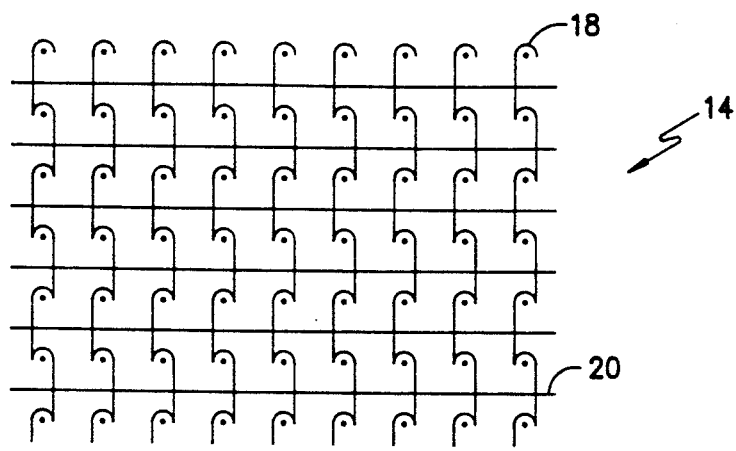
FIG. -1-
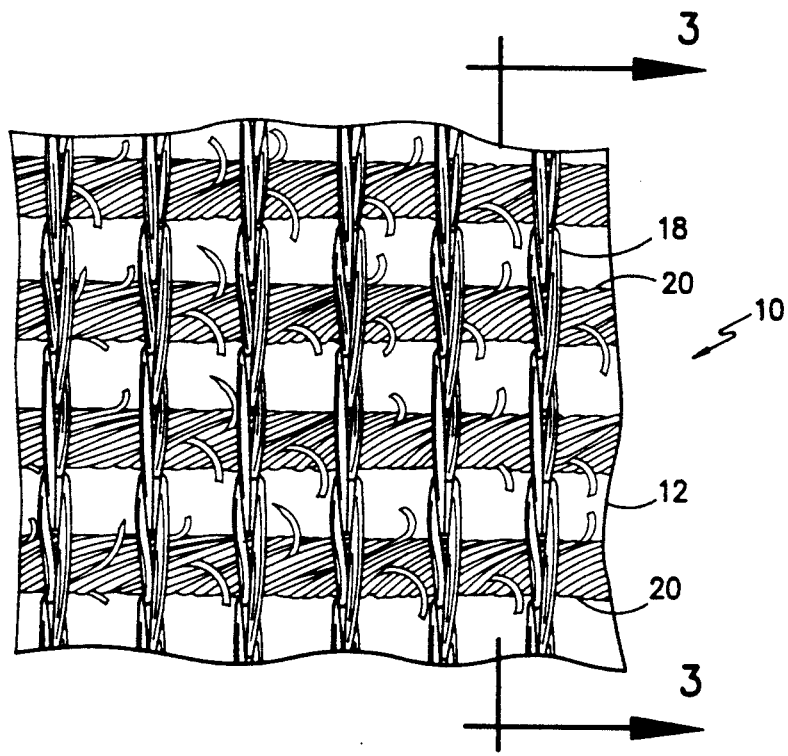
FIG. -2-
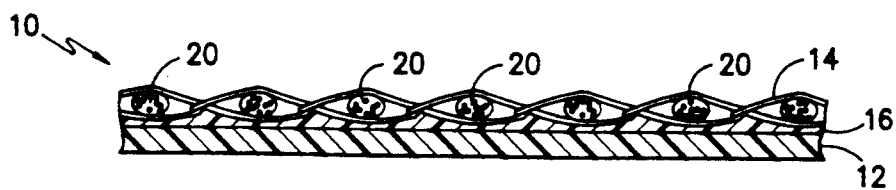
FIG. -3-

WALL COVERING

This invention relates generally to wallcovering or panel covering fabrics and in particular to an inexpensive wallcovering which can be readily manufactured, easily installed and has a pleasant aesthetic effect upon installation.

An object of the invention is to provide a wall product in which the backing thereof is produced more efficiently, economically and provides better geometrics.

Other objects and advantages of the invention will become readily apparent as the specification proceeds to describe the invention with reference to the accompanying drawing, in which:

FIG. 1 is a schematic representation of the stitch arrangement of the supporting textile product of the wallcovering;

FIG. 2 is a bottom view of the wallcovering, and;

FIG. 3 is a cross-section view taken on line 3—3 of FIG. 2.

Looking now to the drawings, the reference numeral 10 refers to a wall covering with a face or outer material of plastic film or paper material 12 having a knit, weft inserted backing substrate 14 adhered to by a suitable adhesive 16 to provide structural integrity to the wall covering product 10.

In the preferred form of the invention the material 12 is a film material of a plastisol such as polyvinyl chloride and the adhesive 14 is an emulsion such as polyvinyl acetate. If the material 12 is of paper stock the adhesive could be a starch or a polyvinyl acetate solution.

As briefly stated the substrate 16 is a one-bar warp knit, weft inserted fabric made on a Raschel or tricot warp knitting machine. The stitch 18 is an open chain stitch of 40 or 70 denier, 34 filament polyester yarn while the weft inserted yarn 20 is a cotton staple yarn with a 27's cotton count. The yarn count of the yarn 20, cotton count, can be in the range of 18's to 30's with the preferred, as stated above, being a 27's count.

The weft inserted cotton yarn allows the manufacture of a wallpaper substrate fabric which can be produced rapidly at a reduced cost and provides structure integrity to the desired geometric design of the fabric.

Although the preferred embodiment of the invention has been described, it is contemplated that many changes may be made without departing from the scope or spirit of the invention and it is desired that the invention be limited only by the claims.

I claim:

1. A wallcovering product comprising: a face material, a substrate fabric and an adhesive between said face material and said substrate fabric to maintain the face material adhered to said substrate fabric, said substrate fabric being a weft inserted warp knit fabric with the weft inserted yarn being cotton with a count in the range of 18's–30's.

2. The product of claim 1 wherein said face material is vinyl.

3. The product of claim 2 wherein said weft inserted yarn has a count of 27.

4. The product of claim 1 wherein said warp knit fabric is chain stitched.

5. The product of claim 4 wherein said face material is vinyl.

6. The product of claim 5 wherein said weft inserted yarn has a count of 27.

* * * * *